United States Patent
Dossena et al.

(10) Patent No.: US 7,082,939 B2
(45) Date of Patent: Aug. 1, 2006

(54) FRAME SAW FOR CUTTING GRANITE AND METHOD TO IMPROVE PERFORMANCE OF FRAME SAW FOR CUTTING GRANITE

(75) Inventors: Ernesto Dossena, Melzo (IT); Markus Jakobuss, Westerville, OH (US); Andre Kuehn, Rossdorf (DE); Kurt Proske, Dreieich-Dreieichenhain (DE); Dennis Turner, Gahanna, OH (US); Michael H. Zimmerman, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 150 days.

(21) Appl. No.: 10/731,066

(22) Filed: Dec. 9, 2003

(65) Prior Publication Data

US 2004/0112358 A1 Jun. 17, 2004

Related U.S. Application Data

(60) Provisional application No. 60/432,222, filed on Dec. 10, 2002.

(51) Int. Cl.
*B25D 1/04* (2006.01)

(52) U.S. Cl. .................. 125/15; 125/16.01; 125/21

(58) Field of Classification Search .............. 125/15, 125/16, 16.01, 21
See application file for complete search history.

(56) References Cited

U.S. PATENT DOCUMENTS

| | | | |
|---|---|---|---|
| 2,674,238 A | 4/1954 | Dessureau | |
| 2,775,236 A | 12/1956 | Blum | |
| 3,662,734 A | 5/1972 | Sisler | |
| 4,566,427 A | 1/1986 | Marechal | |
| 5,181,503 A | 1/1993 | Fish et al. | |
| 5,518,443 A * | 5/1996 | Fisher | 451/540 |
| 6,039,641 A * | 3/2000 | Sung | 451/540 |
| 6,098,609 A * | 8/2000 | Ishizuka | 125/13.01 |
| 6,227,188 B1 * | 5/2001 | Tankala et al. | 125/13.01 |
| 6,286,498 B1 * | 9/2001 | Sung | 125/12 |
| 2003/0127086 A1 | 7/2003 | Brauninger et al. | |

FOREIGN PATENT DOCUMENTS

| | | |
|---|---|---|
| DE | 12 21 133 | 7/1966 |
| EP | 1 038 647 A1 * | 9/2000 |
| EP | 1038647 A1 | 9/2000 |
| GB | 1 206 736 | 9/1970 |
| WO | WO 02/24426 | 3/2002 |
| WO | WO0224426 A1 | 3/2002 |

OTHER PUBLICATIONS

"Natural Diamond Too", Derwent Publications Ltd., London, Jun. 30, 1985.
"As UKR Hard MTLS", Derwent Publications Ltd., London, Jul. 24, 1975.

* cited by examiner

*Primary Examiner*—Lee D. Wilson
*Assistant Examiner*—Alvin J Grant
(74) *Attorney, Agent, or Firm*—Pepper Hamilton LLP (57) ABSTRACT

A horizontal frame saw is equipped with a plurality of generally parallel, spaced-apart blades for cutting granite. Each of the blades has a cutting edge with diamond cutting segments mounted thereon for engaging the granite with a swinging motion for cutting of the granite, wherein the segments have optimized/controlled segment variables for uniform wearing of the segments along each blade during cutting of granite. Segment variables include one or more of: spacing of segments along the length of the blade; diamond concentration in each segment; diamond grade (as measured by compressive fracture strength) in each segment; segment composition (bond, secondary abrasives); or segment dimensions.

20 Claims, 4 Drawing Sheets

FIG. 9

FRAME SAW FOR CUTTING GRANITE AND METHOD TO IMPROVE PERFORMANCE OF FRAME SAW FOR CUTTING GRANITE

CROSS-REFERENCE TO RELATED APPLICATIONS

This application claims priority on U.S. Provisional Application Ser. No. 60/432,222, filed on Dec. 10, 2002.

BACKGROUND OF THE INVENTION

This invention relates to an apparatus and method for cutting slabs of granite.

FIELD OF THE INVENTION

Swing-type frame saws have been used commonly for cutting large granite blocks into slabs. These frame saws employ up to 250 steel blades mounted under tension (e.g., 80 kN) on a frame. The frame typically swings about two pivot points. In order to cut granite, the steel blades work together with a slurry containing steel shot and lime dispersed in water. Cutting speeds of a few cm/hour make this technique slow. For example, cutting a 2-m high block of granite at an average of 3-cm/h downfeed takes almost three days. Both the steel shot process and the time requirements for cutting granite are reasons for the consumption of large amounts of environmentally hazardous steel shot/water/lime slurry. The steel blades also have a useful life of 2–3 blocks on average, which contributes to the costs involved in cutting granite.

Applicants in Published International publication WO 0078517 entitled "Method And Apparatus For Cutting Granite," the disclosures of which are expressly incorporated herein by reference, disclosed the use of a granite-cutting horizontal frame saw whose adjacent and spaced-apart blades include diamond-containing segments mounted on the cutting edge.

In order to replace the conventional method of cutting granite using a swing-type frame saw with one employing diamond-containing segments, two main requirements must be satisfied. First, the operating cost should be similar to that of the conventional process. Second, the granite slabs should be cut with minimum variations in their thickness. Among other factors, the operating cost is heavily influenced by the life of the segments. With respect to uniformity/variations in the slab thickness, thickness variations of less than 10% of the nominal slab thickness are desirable.

Applicants have surprisingly found a combination of diamond composition and abrasive-containing segment design that helps achieve the aforementioned requirements, for an improved performance of the diamond-containing segments on blades, improved uniformity of segment wear along the length of a given blade, and improved finished product in the granite slabs.

BRIEF SUMMARY OF THE INVENTION

The invention relates to a sawing device for cutting granite, stone, marble, bricks, and composite materials thereof, the device is equipped with a plurality of generally parallel, spaced-apart blades for cutting granite, with each of the blades having a plurality of cutting segments mounted thereon, with each of the cutting segments being spaced apart from one another by a center-to-center distance, wherein each of the cutting segments comprises a continuous phase impregnated with a superabrasive material selected from one of natural diamond, synthetic diamond, cubic boron nitride, and combinations thereof.

The invention relates to a sawing device for cutting granite, stone, marble, bricks, and composite materials thereof, the device is equipped with a plurality of generally parallel, spaced-apart blades with each of the blades having a plurality of cutting segments mounted thereon, with each of the cutting segments comprising a continuous phase impregnated with a superabrasive material selected from one of natural diamond, synthetic diamond, cubic boron nitride, and combinations thereof, and wherein the wear resistance property of at least one of the segments is optimized for uniform wearing of the segments along each blade during cutting, and wherein the optimized variable is at least one of a) the center-to-center spacing along the length of the blade; b) concentration of superabrasive materials in each segment; c) grade of superabrasive materials in each segment as measured by compressive fracture strength; d) composition of superabrasive materials in each segment; e) size of superabrasive material in each segment; f) type of segment bond material; g) grade of segment bond material; and h) dimensions of the segment.

The invention further relates to a sawing device for cutting granite, stone, marble, bricks, and composite materials thereof, the device is equipped with a plurality of generally parallel, spaced-apart blades with each of the blades having a plurality of cutting segments mounted thereon, with each of the cutting segments comprising a continuous phase impregnated with a superabrasive material selected from one of natural diamond, synthetic diamond, cubic boron nitride, and combinations thereof, and wherein the abrasive material comprises two or more components with differing size and grade characteristics. These characteristics are described in the body of this document.

DETAILED DESCRIPTION OF THE INVENTION

The invention relates to a horizontal frame saw with diamond-segmented metal blades for cutting granite without the requirement of steel shot slurries in the prior art. A detailed description of the use of a granite-cutting horizontal frame saw employing cutting edges with diamond-containing segments is disclosed in Applicant's Published International Application No. WO 0078517 entitled "Method And Apparatus For Cutting Granite."

Figure 1:
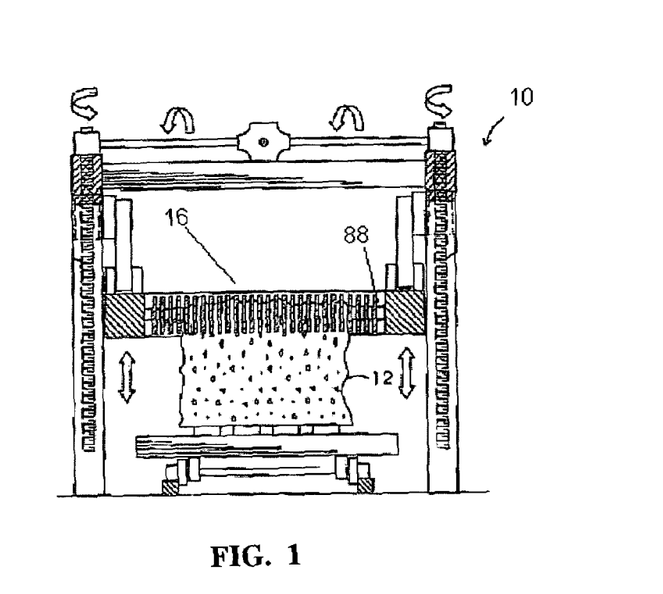
FIG. 1 is a sectional view of the horizontal frame saw of the present invention, cutting through a granite block.
Figure 2:
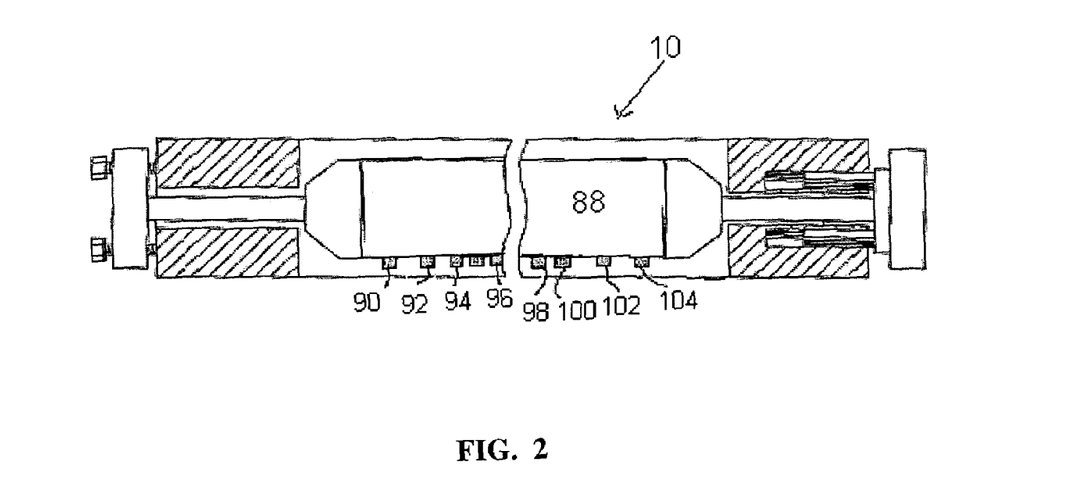
FIG. 2 is a cut-away sectional view of the saw blade and the diamond segments with un-even spacing.

Applicants have surprisingly found a number of diamond segment variables, which were not known in the art, which greatly affect the service life of the saw blades as well as the finished granite slab quality. In one embodiment of the invention and as illustrated in FIGS. 1 and 2, the horizontal frame saw 10 is equipped with a blade assembly 16 having a plurality of generally parallel, spaced-apart blades 88 for cutting granite 12, wherein each of the blades 88 has a cutting edge with diamond cutting segments 90–104 mounted thereon for engaging the granite with a swinging motion for cutting of the granite.

Blades 88 may be made from a wide variety of steels, including high performance steel alloys known in the art. Typical blades may be made from C70 warm rolled steel. An example of a high performance alloy may be a steel with 0.7 to 2.3% carbon, 0.08 to 2.0% aluminum and 0.7 to 6.5% vanadium. In another example, a steel alloy of 0.32% carbon, 0.35% silicon, 0.70% manganese, 1.00% chromium, 2.00% molybdenum, 0.6% nickel, 0.15% vanadium and 0.05% tungsten, the remainder being iron. In a third example, a steel alloy contains from 7 to 20% of tungsten, molybdenum, vanadium and niobium.

In one embodiment, each blade 88 has a height ranging from about 50 to 500 mm. The blades may be of various shapes known in the art, rectangular in most embodiments, double concave (hour-glass), convex/straight, concave/straight, double convex, convex/concave, and combinations thereof.

As disclosed in PCT Application No. WO 0078517, Applicants have found that the use of segments comprising diamonds in saw blades allows granite to be cut without the need of steel shot slurries. It should be noted that in the present invention, "diamond" as used herein refers to superabrasives materials such as natural diamond, synthetic diamond, or cubic boron nitride.

In one embodiment, the cutting segments 90–104 are fabricated from a hard continuous phase material that is impregnated with the superabrasive materials, i.e., natural diamond, synthetic diamond, or cubic boron nitride. In another embodiment, the continuous phase material comprises a metal carbide, a refractory metal alloy, a ceramic, copper, a copper-based alloy, nickel, a nickel-based alloy, cobalt, a cobalt-based alloy, tin, tungsten, titanium, a titanium-based alloy, iron, an iron-based alloy, silver, or a silver-based alloy, or combinations thereof.

In another embodiment, the superabrasive materials are natural or synthetic diamond particles, or a combination thereof, ranging in size from 20 mesh to 400 mesh. In yet another embodiment, the superabrasive particle size is between 25/30-mesh to 70/80-mesh.

The amount of diamond in the segments ranges from 10 to 50 con. The unit "con." is short for concentration, but is defined in the art as 4 times the volume %. For instance, a tool with 100 con has 0.25 cm$^3$ diamond per cm$^3$, or 25 vol % diamond.

In one embodiment, the diamond in the segments has a toughness index ("TT") ranging from between about 26 and 88. The toughness index is measured by a standard friability test known in the art. The friability test involves ball milling a quantity of product under controlled conditions and sieving the milled material to measure the breakdown of said product. The reported "toughness index" ("TT") refers to the weight fraction of diamond larger than a threshold size.

In one embodiment, the segments contain diamond particles coated with a layer of a material of composition, $MC_xN_y$, where M is a metal, C is carbon having a first stoichiometric coefficient x, N is nitrogen having a second stoichiometric coefficient y, and $0 \leq x$, and $y \leq 2$, where M is one or more of a transition metal, a Group IIIA metal, or a Group IVA metal. Such metal coatings are known to increase the strength with which the superabrasive material bonds to the continuous phase material.

In one embodiment, the continuous phase material in the segments may be impregnated with a combination of various types of abrasive materials, i.e., secondary abrasives materials such as ceramics, e.g. aluminum oxide. The continuous phase material and the superabrasives, i.e., diamonds or CBN, may be aggregated into the final segment shape by known processes that bond the continuous phase material and the particles of superabrasives/abrasives together, such as sintering, hot isostatic pressing, laser melting, or ion beam melting.

In one embodiment, the diamond cutting segments on the saw blades range in size from about 5 to 100 mm in length by 5 to 50 mm in height by 4 to 8 mm in thickness. In one embodiment of the invention, the diamond segment is thicker than the thickness of the blade. In yet another embodiment, the saw blade includes a plurality of recesses configured to receive at least a portion of the segments.

In one embodiment, the diamond segments are spaced (center to center) from about 80 mm to 150 mm apart. In another embodiment, the center to center spacing is about 100 to 140 mm. In yet another embodiment, the center to center spacing is about 120 to 130 mm.

The segments can be in any convenient shape including, e.g., rectangular, tapered, sandwich, tooth-shaped, L-shaped, semi-circle shaped, and the like. The segments may be shaped by techniques known in the art, such as by sintering, casting, forging or machining.

The segments are attached to the blade edge by means known in the art, including brazing, soldering, laser welding, adhesives, mechanical affixation, and the like.

Implicit in the disclosure of PCT Application No. WO 0078517 is the assumption that segments along the length of a given blade all wear out at the same rate and that the segments are equally spaced along the saw blade length, e.g., 20 mm center-to-center to about 400 mm center-to-center depending on the stroke length of the particular swing-type saw operation. Also implicit in the application is that the segments are of the same material, i.e., having the same properties. However, Applicants have found that diamond segments do wear out at different rates. Since a blade's useful life expires as soon as the first segment has been fully consumed, the uniform spacing and uniform property of the diamond segments in the prior art lead to relatively short life and more costly frame saw operations.

It is desirable to have the diamond segments on a saw blade in a frame saw wear out at a rate as uniformly as possible. Applicants have discovered improved methods that minimize the variations in segment wear rate along the length of the blade and prolong the service life of horizontal frame saw blades employing diamond segments.

Generally, segment life may be expressed as the mean wear performance of those segments engaged in cutting the granite. This wear performance is determined by dividing the area of granite cut by the height reduction of the segments, and it is typically given in units of m²/mm.

Varying the Spacing of the Diamond Segments

Applicants have found that location of the granite block relative to a given blade and the kinematics of a frame saw lead to segment-block interactions that vary with position along the length of the blade. For example, segments near the mid-point of the blade length remain in contact with the block for a greater fraction of the swing path relative to those near either end point. Further, those segments near the end of the blades will experience significantly higher impact forces when engaging the block relative to those toward the middle of the blade length.

A surprisingly simple solution that helps improve and prolong saw blade service life, or particularly the service life of diamond segments in saw blades, is optimizing the spacing of the diamond segments along the saw blade. In the horizontal frame saw of the invention, the diamond segments are distributed along the blade length with non-uniform spacing. In locations along the length having a propensity for higher wear rates, a greater number of segments per unit length are mounted. Conversely, in locations along the blade length having a propensity for lower wear rates, a smaller number of segments per unit length are mounted.

As used herein, "non-uniform spacing" means that there is a variation of at least 1 mm from the minimum center-to-center spacing distance X1 (between two adjacent diamond segments on a saw blade) to the maximum center-to-center spacing distance X2 between two adjacent diamond segments on the same saw blade, i.e., X1 is 1 mm less than X2.

As used herein, the center or near-center segments refer to segments that are at the center or located at a distance within 25% of saw blade length from the center of the saw blade.

Also used herein, end or near-end segments refer to segments that are located at the end or within 25% or ¼ of saw blade length from the end of the saw blade.

In one embodiment of the invention, the center-to-center spacing "X" of the segments in the center or near-center section of the saw blade is at least 1 mm less than the center-to-center spacing of the segments in the two end or near-end sections of the saw blade. In a second embodiment, the center-to-center spacing X of the segments in the center or near-center section is at least 2 mm less than the center-to-center spacing of the segments in the two end or near-end sections of the saw blade. In a third embodiment, the center-to-center spacing X of the segments in the center or near-center section is at least 3 mm less than the center-to-center spacing of the segments in the two end or near-end sections of the saw blade. In a fourth embodiment, the center-to-center spacing X of the segments in the center or near-center section is at least 5 mm less than the center-to-center spacing of the segments in the two end or near-end sections of the saw blade.

In yet another embodiment of the invention, the center-to-center spacing "X" between the segments varies gradually from the center section of the saw blade to the end sections of the saw blade, e.g., the diamond segments located within 25% length of the center of the saw blade have a spacing variation of at least 1 mm; diamond segments located at distance from 25–30% of the saw blade length from the center have a spacing variation of at least 2 mm; diamond segments located at distance from 30% to 35% of the center of the saw blade have a spacing variation of at least 3 mm; and the segments located at distance from 35–50% of the center of the blade have a spacing variation of at least 5 mm.

In one embodiment of the invention, the center-to-center spacing "X" of the segments in the center or near-center section of the saw blade is kept as least 50% of the center-to-center spacing of the segments in the two end or near-end sections of the saw blade. In yet another embodiment of the invention, the center-to-center spacing "X" between the segments varies gradually from the center section of the saw blade to the end sections of the saw blade, e.g., the diamond segments located within 25% length of the center of the saw blade have a spacing distance of "X"; diamond segments located at distance from 25–30% of the saw blade length from the center have a spacing distance of "125% X"; diamond segments located at distance from 30% to 35% of the center of the saw blade have a spacing distance of "150% X"; and the segments located at distance from 35–50% of the center of the blade have a spacing distance of "200% X."

Varying the Wear-Resistance Properties of Diamond Segments

In conjunction with varying the spacing of the diamond segments, or as a separate approach to prolonging the service life of saw blades, diamond segments with varying properties are distributed along the length of the blade (with either uniform or non-uniform spacing). In locations along the length having a propensity for higher wear rates, segments with higher wear resistance are mounted. Conversely, in locations along the blade length having a propensity for lower wear rates, segments with lower wear resistance are mounted.

As used herein, "variable wear-resistant property" means that there is a variation of at least 10% in a variable contributing to the wear resistance of the diamond segments on a saw blade, from one diamond segment to another diamond segment on the same saw blade. As the wear resistance of a diamond segment depends on several variables as follows, at least one of the variables can be varied from one segment to another (of all segments on a saw blade) for a more uniform wear-out rate.

Diamond Concentration

In general, the wear resistance increases with increasing concentration of diamond in the bond. In one embodiment of the invention, the segments located near or at the center of the saw blade have at least 1 vol % more diamond crystal than the segments located near or at the ends of the saw blade. In another embodiment, the center or near-center segments comprise at least 2 vol % more diamond crystals than the end or near-end segments.

Diamond Size

In general, the wear resistance increases with decreasing diamond particle size. For a given diamond concentration, the number of diamond particles per unit volume increases as the particle size decreases. This results in a reduction in the load on the individual particles during a cutting operation. The load reduction results in a longer active crystal life, thus providing the increased wear resistance of the segment.

In one embodiment of the invention, segments located near or at zones that experience high relative wear rates contain diamond whose average particle size is at least 10% smaller than those segments located at or near zones that experience lower relative wear rates.

In one embodiment of the invention, the segments located near or at the center of the saw blade contain diamond whose average particle size is at least 15% smaller than those segments located at or near the ends of the saw blade.

In yet another embodiment of the invention, the segments located near or at the center of the saw blade contain diamond whose average particle size is at least 20% smaller than those segments located at or near the ends of the saw blade.

Diamond Grade

In general, wear resistance increases with increasing diamond grade, as measured by compressive fracture strength "CFS" for example. Compressive Fracture Strength (CFS) is determined by measuring and recording the force required to fracture a crystal between two tungsten carbide rollers. As used here, CFS values refer to the mean CFS of a sample of at least 600 crystals.

Crystal strength and shape typically characterize the grade of a diamond. A mix of size and grade can be used to influence the diamond type and its CFS. In one embodiment, the saw blade may have some segments with diamond blends varying from 80% coarse (and 20% non-coarse) to 20% coarse (and 80% non-coarse) and in between.

In one embodiment of the invention, segments located near or at zones that experience high relative wear rates contain diamond whose average CFS is at least 10% higher than those segments located at or near zones that experience lower relative wear rates.

In another embodiment of the invention, the segments located near or at the center of the saw blade contain diamond whose average CFS is at least 15% higher than those segments located at or near the ends of the saw blade.

Segment Length

In general, the wear resistance increases with increasing segment length, where length is defined as the segment dimension parallel to the blade length when attached as in FIG. 2. In one embodiment, the segments located near or at the center of the saw blade have segment lengths of at least 10% longer than the segments located near or at the ends of the saw blade.

Bond Wear Resistance

In general, the wear resistance increases with increasing wear resistance of the materials that constitute the bond, i.e., the continuous phase material comprising a metal carbide, a refractory metal alloy, and the like.

In one embodiment of the invention, there is a difference in the make-up of the materials constituting the bond of the segments located near or at the center of the saw blade and the segments located near or at the ends of the saw blade, for a difference of at least 10% in the wear resistance property of the materials constituting the bond of the segments located near or at the center of the saw blade and the segments located near or at the ends of the saw blade.

Presence of Secondary Abrasives

In general, the wear resistance increases with increasing concentration of secondary abrasives. Common secondary abrasives used in diamond tools include, inter alia, tungsten carbide (WC), silicon carbide (SiC), and aluminum oxide (Al2O3).

In one embodiment of the invention, the segments located at or near-center of the saw blade have at least 10 wt. % or more of secondary abrasives than the segments located at or near-end of the saw blade. In a second embodiment of the invention, the segments located near or at the center of the saw blade have at least 15 wt. % more of secondary abrasives than the segments located near or at the ends of the saw blade.

Diamond Blending

Implicit in the disclosure of PCT Application No. WO 0078517 is the assumption that segments contain diamond of a single size and grade. Applicants have found that overall performance of a diamond-based frame saw for cutting granite may be optimized by using diamond blends containing two or more components having different mean size and grade. These blends generally comprise a coarse and fine component, in which the coarse component is of a higher grade than the fine component. Additionally, the coarse component comprises between 20% and 80% by weight of the total diamond.

In one embodiment of the invention, diamond comprising a coarse component and fine component is blended. In another embodiment, the diamond blend comprises 20–60 wt. % coarse components, with a mean particle size that is at least 300 μm greater than the fine component's, and a mean CFS that is at least 70N greater than that of the fine component. In yet another embodiment, the diamond blend comprises 30–50 wt. % coarse components, with a mean particle size that is at least 200 μm greater than the fine component's, and a mean CFS that is at least 50N greater than that of the fine component.

Applications of the Frame Saw of the Present Invention

The frame saw of the present invention may be used for cutting large granite blocks into slabs (thus the term slabbing) conveniently for longer periods of time.

It should be further noted that the frame saw of the present invention may be used in cutting materials other than granite, including but not limited to masonry materials such as concrete, marble, sandstone, limestone, fired brick or a like material, as well as for cutting blocks of composite material made of stone or marble chippings bound together by a binder material.

EXAMPLES

Examples are provided herein to illustrate the invention but are not intended to limit the scope of the invention.

Examples 1 and 2

Varying Segment Spacing

To demonstrate the impact of varying the segment spacing on wear performance along the blade length, experiments are conduced using several distributions, two of which are detailed herein.

Figure 3:
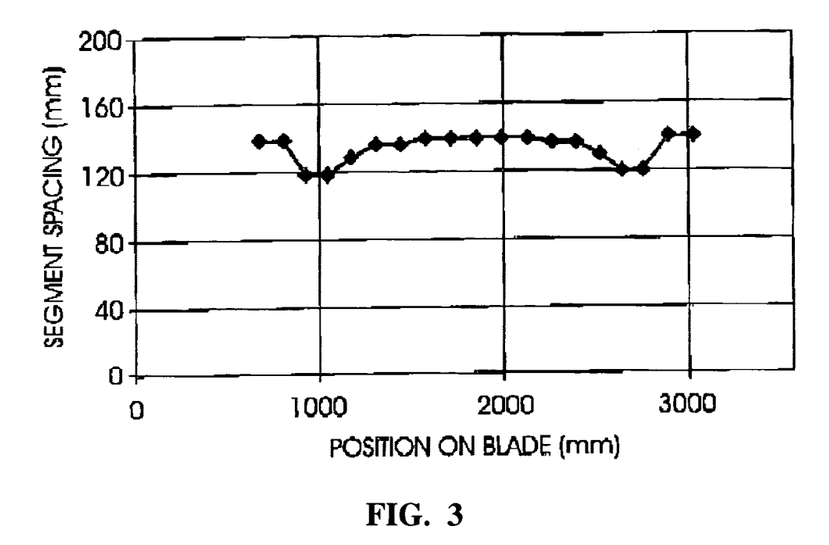
FIG. 3 graphically plots segment spacing along the blade versus position on the blade for a first segment spacing distribution test.
Figure 4:
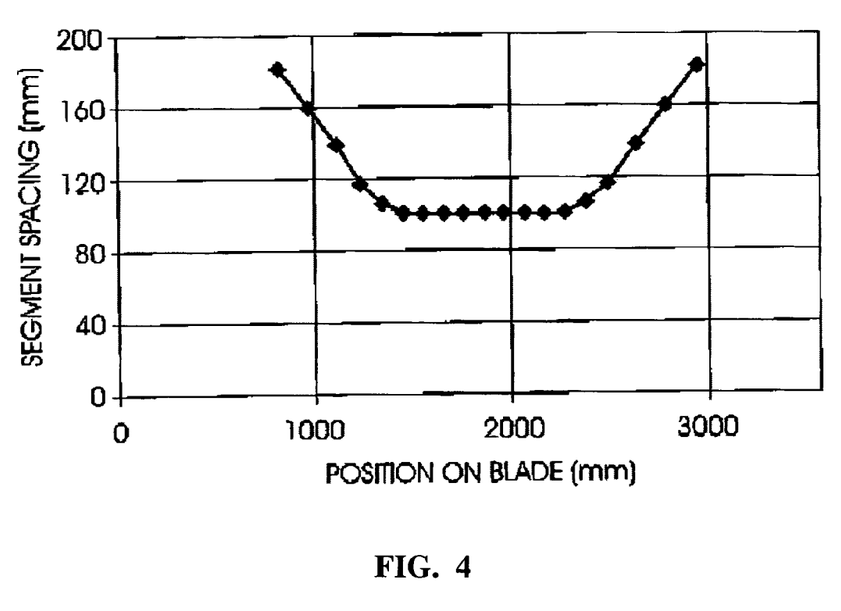
FIG. 4 graphically plots segment spacing along the blade versus position on the blade for a second segment spacing distribution test.
Figure 5:
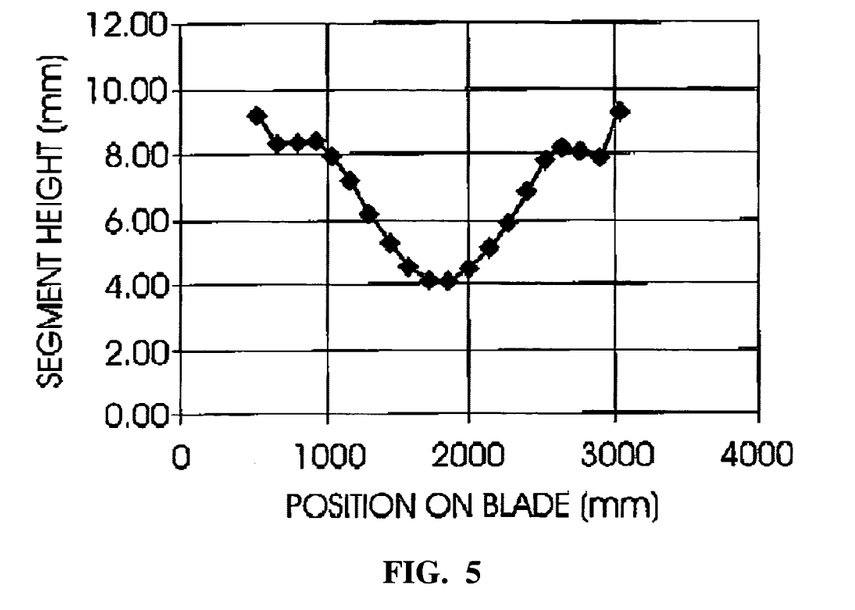
FIG. 5 graphically plots segment height versus position on the blade for the first segment spacing distribution test.
Figure 6:
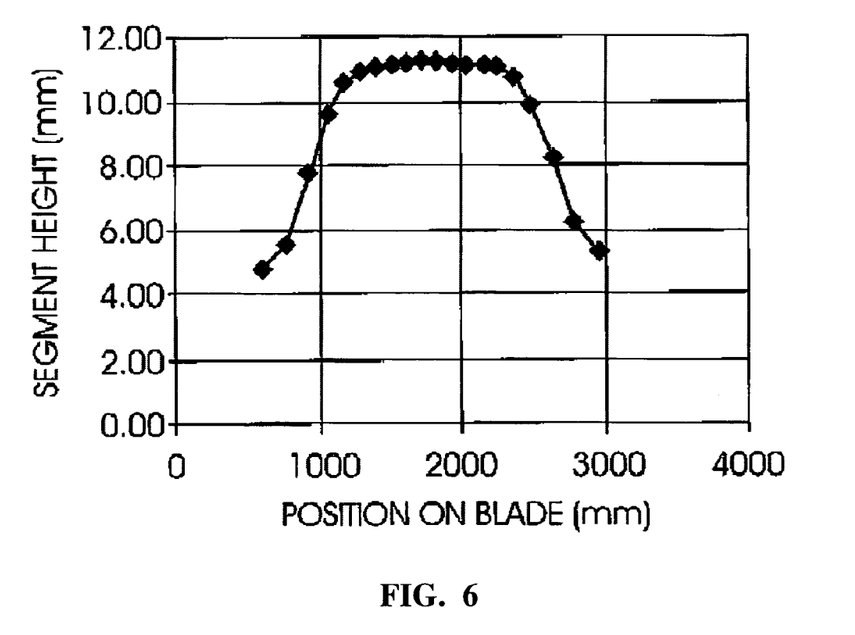
FIG. 6 graphically plots segment height versus position on the blade for the second segment spacing distribution test.

In Example 1, the segments are mounted on the blades with a nearly uniform spacing distribution (as illustrated in FIGS. 3 and 5). In Example 2, the segments are spaced closer together near the midpoint of the blade and farther apart near the ends of the blades (as illustrated in FIGS. 4 and 6).

In each run, approximately 50 blades of Examples 1 and 2 are used to cut Rosa Beta granite (class III) into slabs on a swing-type frame saw. Cuts are made to a minimum depth of 50 cm. The height of every segment then is measured and an average was calculated for each segment position over all of the blades. All segments are of the same composition, and in each run, all factors, aside from spacing, are as follows:

Segment

A number of runs are repeated for each example, with each run segment concentration varies between 15 to 40 concentration of diamond crystals, diamond size ranging from 20–50 mesh, in a cobalt-based bond commercially available from OMG, Eurotungstene, or other manufactures.

Each run uses segments of the same size, with segment dimensions varying for each run and ranging from 10–40 mm in length, 4–8 mm in width, and 10–30 mm in height, and with 20–30 segments per blade.

Blades: carbon alloy steel blades.

Operating conditions: 30 mm/h down-feed rate; and 13 l/min water delivered to each blade.

FIGS. 3 and 4 represent the segment spacing distributions for two of the runs of Examples 1 and 2, respectively. The results of the measured segment heights are presented in FIGS. 5 and 6 for Examples 1 and 2, respectively.

It will be observed that for the blades with uniform segment spacing (FIG. 3 spacing), the average height of the segments decreases dramatically towards the center of the blades compared to the outer ends of the blades. This shows greater wear experienced by the segments towards the center of the blades.

When the segments are concentrated towards the center compared to the blade ends (FIG. 4 spacing), the average heights of the segments toward the center of the blades are dramatically higher than for the segments towards the ends of the blades. These results show that the wear rate of the segments can be influenced merely by the location of the segments along the length of the blades.

Example 3

Diamond Blends

In this example, Applicants conduct designed experiments (DOE's) to understand and quantify the effects of varying the diamond segment properties on segment wear rates. It is surprisingly found that performance improvement in the slabbing (cutting) of granite is achieved by blending different sizes and grades of metal bond sawing diamond in the segments used on blades in the slabbing operation. Performance improvement leads to longer operations/service life of the segments in the saw blades.

The following scheme is used to define the DOE's in terms of blending different diamond sizes/grades of metal bond sawing diamond:

Three sets of runs are conducted for Experiment 3, with blends varying in the range of 20%–80% Component 1 to Component 2, or combinations in between, e.g., 60%–40% and 80%–20%.

The runs are conducted with saw blades of identical dimensions and varying in the range of 4–6 m long, 4 mm–6 mm thick, -60–150 mm high; and blade tension varying for each run from 80–100 kN.

The segments are kept the same dimensions in each run, with varying dimensions from one run to the next. The segment dimensions vary from 10–40 mm in length, 4–8 mm in width, and 10–30 mm in height, prepared with the factors above, and brazed to the steel saw blades.

The components comprise diamond crystals of 20–80 mesh size and CFS ranging from 75–300 N.

The grade and size of Component 2 are varied relative to the grade and size of Component 1.

The CFS of Component 2 is always lower than the CFS of Component 1.

Component 2 is always finer than Component 1.

Each experiment is conducted with all other variables fixed. In the experiments, sets of fifty blades each are prepared according to the DOE specifications. The factors are: (1) Grade Difference, meaning "Mean CFS of Component 1—Mean CFS of Component 2"; (2) Size Difference, meaning "Mean Size of Component 1—Mean Size of Component 2"; and (3) % Coarse, or % by weight of Component 1.

The granite cut is class III Rosa Sardo (dimensions of about 2.85 m length by 1.8 m height, and 2 m width).

The saw used is a swing-type, granite gang saw operating in the range of 60–80 cycles per minute with a 500–700 mm stroke, for a cutting speed ranging from about 1 to 1.5 m/s for the runs.

Each run is started with a slow downfeed (1–3 cm/h) until all the segments are fully engaged in the block (1–3 hrs). The downfeed then is increased to approximately 3 cm/h. until segments exhibit measurable wear. The evaluation is performed by measuring the segment wear of a representative number of segments of each blade.

In the Designed Experiment, the CFS difference variable is set at two levels, between 50–65 N and between 70–90 N. The size difference variable is set at two levels, between 150–180 and between 220–280 μm.

Table 1 shows the mean wear performance of the segments and the mean thickness variation in the finished granite slabs.

| Run | Mean Wear Performance ($m^2$/mm) | Mean Slab Thickness Variation (mm) |
|---|---|---|
| 1 | 0.47 | 1.69 |
| 2 | 0.57 | 4.73 |
| 3 | 0.46 | 1.73 |
| 4 | 1.83 | 4.70 |

The results obtained above are analyzed using standard statistical methods to determine how each of the parameters influenced both wear performance and slab thickness variation. The resulting transfer functions for wear performance and slab thickness are also extrapolated to determine the blend composition, which simultaneously achieves a wear performance greater than or equal to 1.5 $m^2$/mm and a slab thickness variation less than or equal to 1 mm.

Figure 7:
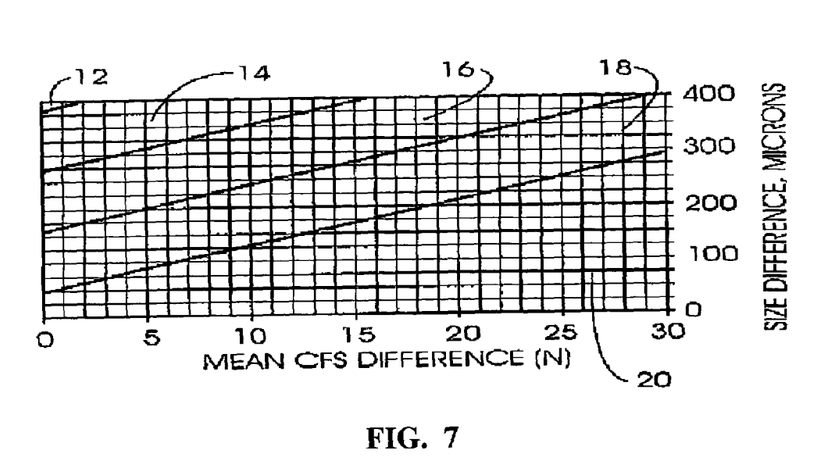
FIG. 7 graphically plots grade difference of diamond in the segment versus size difference of the diamond for determining wear performance ($m^2$/mm)
Figure 8:
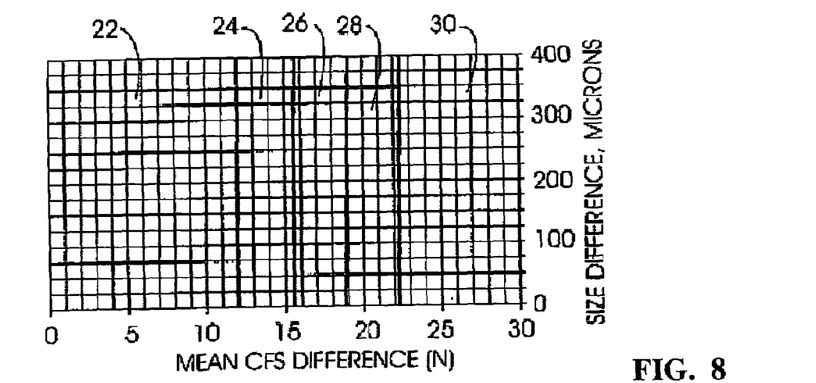
FIG. 8 graphically plots grade difference of diamond in the segment versus size difference of the diamond for determining granite slab thickness variation (mm)

With % Coarse fixed at 20%, the response surfaces for wear performance and slab thickness variation are given in FIGS. 7 and 8, respectively. In particular, FIG. 7 shows several wear performance areas, as follows:

| Area 12 | 4.00–5.00 $m^2$/mm |
| Area 14 | 3.00–4.00 $m^2$/mm |
| Area 16 | 2.00–3.00 $m^2$/mm |
| Area 18 | 1.00–2.00 $m^2$/mm |
| Area 20 | 0.00–1.00 $m^2$/mm |

FIG. 8 shows slab thickness variation areas, as follows:

| Area 22 | 3.00–4.00 mm |
| Area 24 | 2.00–3.00 mm |
| Area 26 | 1.00–2.00 mm |
| Area 28 | 0.00–1.00 mm |

Figure 9:
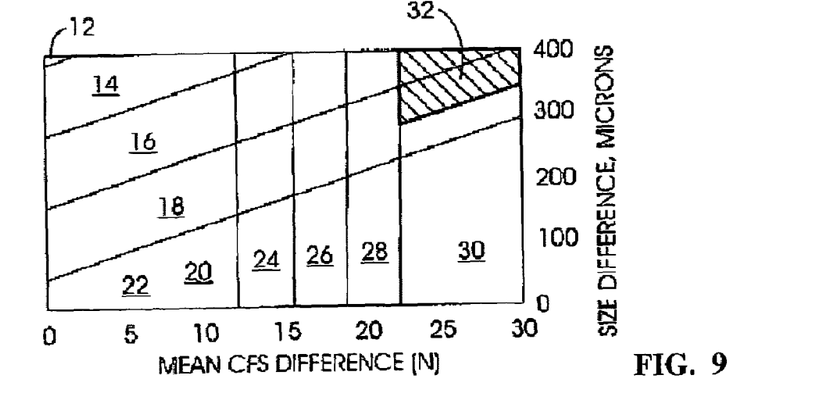
FIG. 9 is a graph illustrating one embodiment of the invention, for diamond crystals that satisfies both wear performance and slab thickness variation criteria.

In this embodiment with % Coarse fixed at 20%, the region that satisfies both the wear performance and slab thickness variation criteria is determined graphically or analytically in FIG. 9. Area 32 represents the optimal region for both the wear performance and slab thickness by blending diamond by grade and by size. Operable wear performance and slab thickness, however, can be realized by the operator within the region bounded by intersection of regions 26 and 28 with regions 16 and 18. While not explicitly included as an example, similar performance results have been obtained with the Coarse component comprising higher percentages, e.g. 40 wt %.

As illustrated in the embodiments above, Applicants have surprisingly found that: a) blending different sizes and grades of saw diamond can be an approach to achieve higher wear performance and/or lower slab thickness variation; and b) using diamonds of different blends, a coarse material of a higher grade than the fine material, is another approach to achieve higher wear performance and/or lower slab thickness variation.

While the invention has been described with reference to a preferred embodiment, those skilled in the art will understand that various changes may be made and equivalents may be substituted for elements thereof without departing from the scope of the invention. All citations referred herein are expressly incorporated herein by reference.

We claim:

1. A device for cutting a block into slabs, said device comprising:
    a plurality of generally parallel, spaced-apart blades,
    each of the blades having a blade length with two ends and a center,
    each of the blades having a plurality of cutting segments mounted thereon, the cutting segments being spaced apart from one another by a center-to-center distance,
    each of the cutting segments comprising a continuous phase impregnated with a superabrasive material selected from one of natural diamond, synthetic diamond, cubic boron nitride, and combinations thereof; and
    wherein there is a spacing variation of at least 1 mm between a maximum center-to-center distance and a minimum center-to-center distance of the cutting segments.

2. The device of claim 1, wherein at least one of the cutting segments located at or within 10% of blade length from each end of the blades have a center-to-center spacing that differs by at least 1 mm from the center-to-center spacing of at least one of the cutting segments located at or within 10% of blade length from the center of the blades.

3. The device of claim 2, wherein at least one of the cutting segments located at or within 25% of blade length from each end of the blades have a center-to-center spacing that differs by at least 2 mm from the center-to-center spacing of at least one of the cutting segments located at or within 25% of blade length from the center of the blades.

4. The device of claim 2, wherein at least one of the cutting segments located at or within 25% of blade length from each end of the blades have a center-to-center spacing that differs by at least 5 mm from the center-to-center spacing of at least one of the cutting segments located at or within 25% of blade length from the center of the blades.

5. The device of claim 1, wherein at least one of the cutting segments has a wear resistance property that differs by at least 10% from the wear resistance property of at least one of the other cutting segments mounted on the same blade.

6. The device of claim 1, wherein at least one of the cutting segments has at least one wear resistance variable that is different from at least one of the other cutting segments mounted on the same blade, wherein the at least one wear resistance variable is selected from the group of:
    concentration of the superabrasive materials;
    grade of the superabrasive materials as measured by compressive fracture strength (CFS) property;
    at least one dimension of said segment;
    amount of secondary abrasives in said segment;
    concentration of secondary abrasives in said segment; and
    grain size of said superabrasive materials.

7. A device for cutting a block into slabs, said device comprising:
    a plurality of generally parallel, spaced-apart blades,
    each of the blades having a plurality of cutting segments mounted thereon, the cutting segments being spaced apart from one another by a center-to-center distance,
    each of the cutting segments comprising a continuous phase impregnated with a superabrasive material selected from one of natural diamond, synthetic diamond, cubic boron nitride, and combinations thereof,
    wherein at least one of the cutting segments has a wear resistance property that differs by at least 10% from the wear resistance property of at least one of the other cutting segments mounted on the same blade.

8. The device of claim 7, wherein at least one cutting segment has at least one wear resistance property variable that is different from at least one of the other cutting segments, said at least one wear resistance variable is selected from the group of:
    concentration of the superabrasive materials,
    grade of the superabrasive materials as measured by compressive fracture strength (CFS) property;
    at least one dimension of said segment;
    amount of secondary abrasives in said segment;
    concentration of secondary abrasives in said segment; and
    grain size of said superabrasive materials.

9. The device of claim 7, wherein at least two of the cutting segments comprise superabrasive materials with different sizes and grades.

10. The device of claim 7, wherein the cutting segments contain blends of at least two components: coarse diamond crystals and fine diamond crystals having different compressive fracture strength (CFS) properties, and where the coarse diamond crystals have a CFS of at least about 70 N greater than the fine diamond crystals.

11. The device of claim 10, wherein the CFS property difference between the coarse diamond crystals and the fine diamond crystals is between about 70 N and 100 N.

12. The device of claim 10, wherein the coarse diamond crystals are at least about 300 µm larger than the fine diamond crystals.

13. The device of claim 10, wherein the size difference between the coarse diamond crystals and the fine diamond crystals is between about 300 and 400 µm.

14. A method for cutting a block, the method comprising:
    providing a cutting device comprising a plurality of generally parallel, spaced-apart blades, each of the blades having a plurality of cutting segments mounted thereon, the cutting segments being spaced apart from one another by a center-to-center distance, each of the cutting segments comprising a continuous phase impregnated with a superabrasive material selected from one of natural diamond, synthetic diamond, cubic boron nitride, and combinations thereof, wherein at least one of the cutting segments has a higher wear resistance property than at least one of the other cutting segments mounted on the same blade; and cutting a block using the cutting device.

15. A method for cutting a block comprising:

providing a cutting device comprising a plurality of generally parallel, spaced-apart blades, each of the blades having a blade length with two ends, a center, and a plurality of cutting segments mounted thereon, the cutting segments being spaced-apart from one another by a center-to-center distance, each of the cutting segments comprising a continuous phase impregnated with a superabrasive material selected from one of natural diamond, synthetic diamond, cubic boron nitride, and combinations thereof, wherein there is a spacing variation of at least 1 mm between maximum center-to-center distance of the cutting segments; and cutting a block using the cutting device.

16. The method of claim 15, wherein at least one of the cutting segments located at or within 10% of blade length from each end of the blades have a center-to-center spacing that differs by at least 2 mm from the center-to-center spacing of at least one of the cutting segments located at or within 10% of blade length from the center of the blades.

17. The method of claim 15, wherein at least one of the cutting segments has at least one wear resistance property variable that is different from said at least one of the other cutting segments, said at least one wear resistance variable is selected from the group of:

concentration of the superabrasive materials, grade of the superabrasive materials as measured by compressive fracture strength (CFS) property, dimensions of said segment, amount of secondary abrasives in said segment, concentration of secondary abrasives in said segment, and grain size of said superabrasive materials.

18. The method of claim 17, wherein the cutting segments contain blends of at least two components: coarse diamond crystals and fine diamond crystals having different compressive fracture strength (CFS) properties, and wherein the coarse diamond crystals have a CFS of at least about 70 N greater than the fine diamond crystals.

19. A device for cutting a block into slabs, comprising:

a plurality of generally parallel, spaced-apart blades, each of the blades having a plurality of cutting segments mounted thereon, each of the cutting segments comprising a continuous phase impregnated with a superabrasive material selected from one of natural diamond, synthetic diamond, cubic boron nitride, and combinations thereof;

wherein segments located within zones that experience high relative wear rates contain superabrasive material having a higher average CFS than segments located within zones that experience lower relative wear rates.

20. The device of claim 19 wherein the higher average CFS is at least 10%.

* * * * *

UNITED STATES PATENT AND TRADEMARK OFFICE
CERTIFICATE OF CORRECTION

PATENT NO. : 7,082,939 B2 Page 1 of 1
APPLICATION NO. : 10/731066
DATED : August 1, 2006
INVENTOR(S) : Ernesto Dossena et al.

It is certified that error appears in the above-identified patent and that said Letters Patent is hereby corrected as shown below:

Column 4, line 2, "TT" should be changed to --TI--.

Column 4, line 7, "TT" should be changed to --TI--.

Column 9, line 54, "-60-150" should be changed to --60-150--.

Signed and Sealed this

Twelfth Day of December, 2006

JON W. DUDAS
*Director of the United States Patent and Trademark Office*